Fig. 2.

UNITED STATES PATENT OFFICE.

CLAYTON GUY COOKE, OF NEW HAVEN, CONNECTICUT, ASSIGNOR TO THE GEORGE M. GRISWOLD MACHINE COMPANY, OF NEW HAVEN, CONNECTICUT, A CORPORATION OF CONNECTICUT.

PAPER-BOX MACHINE.

1,053,087.   Specification of Letters Patent.   Patented Feb. 11, 1913.

Application filed January 23, 1911. Serial No. 604,138.

*To all whom it may concern:*

Be it known that I, CLAYTON GUY COOKE, citizen of the United States, and resident of New Haven, in the county of New Haven and State of Connecticut, have invented certain new and useful Improvements in Paper-Box Machines, of which the following is a specification.

This invention relates to new and useful improvements in paper box machines and refers particularly to that class of machines designed to make the inner or slide member of a two part tobacco, cigarette, match or like box, and the invention resides particularly in means for suitably creasing, cutting, gluing and folding such an inner box member whereby the same may be formed complete with its opposite end portions turned over, in and secured against the inner surface of the adjoining end portions of the box whereby said ends are materially reinforced. This class of box has heretofore been made by hand only, and aside from being more expensive is not as good as that formed by my present machine, since the sides could not be made to stand up at a right angle to the bottom, thus producing somewhat of a dish shaped box that would not slide in and out of the tube as freely, nor was it as durable as that which I now form by this machine.

It is therefore the purpose of this invention to produce a machine which is of a comparatively simple, durable and compact construction, consistent with the work to be performed, and whereby a strip of paper, of a proper width may be successively drawn from a roll and fed through the machine to form the inner or slide members of boxes of the above class, in rapid succession, all perfect and complete ready to be filled and slid into the tubes; to provide a machine whereby the blanks may be creased and reversely creased along the lines of the folds of the box to properly break the paper so as to insure the sides of the box being finally disposed at a right angle to the bottom and whereby the folded edges and corners will be formed sharp and square; further to provide means for turning up, over and in the two extreme end portions of the box blank and sticking the same against the inside of the box, thus inclosing the four free ends of the sides which have previously been turned in toward each other; to thus construct and form a box in a way to cover all raw ends and edges except the top edges of the two sides of the box, and finally to thus produce a machine for reinforcing and strengthening the ends of a tray or slide member of a paper box, where the greatest strain occurs, as for instance, when pushing in or pulling out the tray, as in the manner of opening and closing the box for the removal of its contents.

With these and other objects in view the invention consists in the construction and novel combination and arrangement of parts hereinafter fully described, and illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Upon the accompanying nine sheets of drawings forming a part of this specification, similar characters of reference will be found to designate like or corresponding parts throughout the several figures and of which—

Fig. 4, is a vertical cross section looking toward the rear, and taken on line 4—4 of Fig. 2.

Referring in detail, to the characters of reference marked upon the drawings 25 indicates the bed of the machine which as shown is supported upon suitable legs secured to the under side of the corners of the bed. The several parts of the machine are supported upon this bed, except the stand 26 for carrying the roll of paper 27 which is obviously mounted so as to freely rotate in a manner to permit the strip of paper to be unwound and drawn under the roll 28 and up through the guide 29 which directs the paper between the glue wheels 30 and guide roll 31. The glue wheels are mounted upon a shaft journaled in bearings in the top portion of the opposite sides of the glue tank 32 which latter is secured to the bed of the machine in any suitable manner, and may be provided on its under side with a gas flame, steam pipe or other means of heating the glue, not shown.

Figures 4, 22:
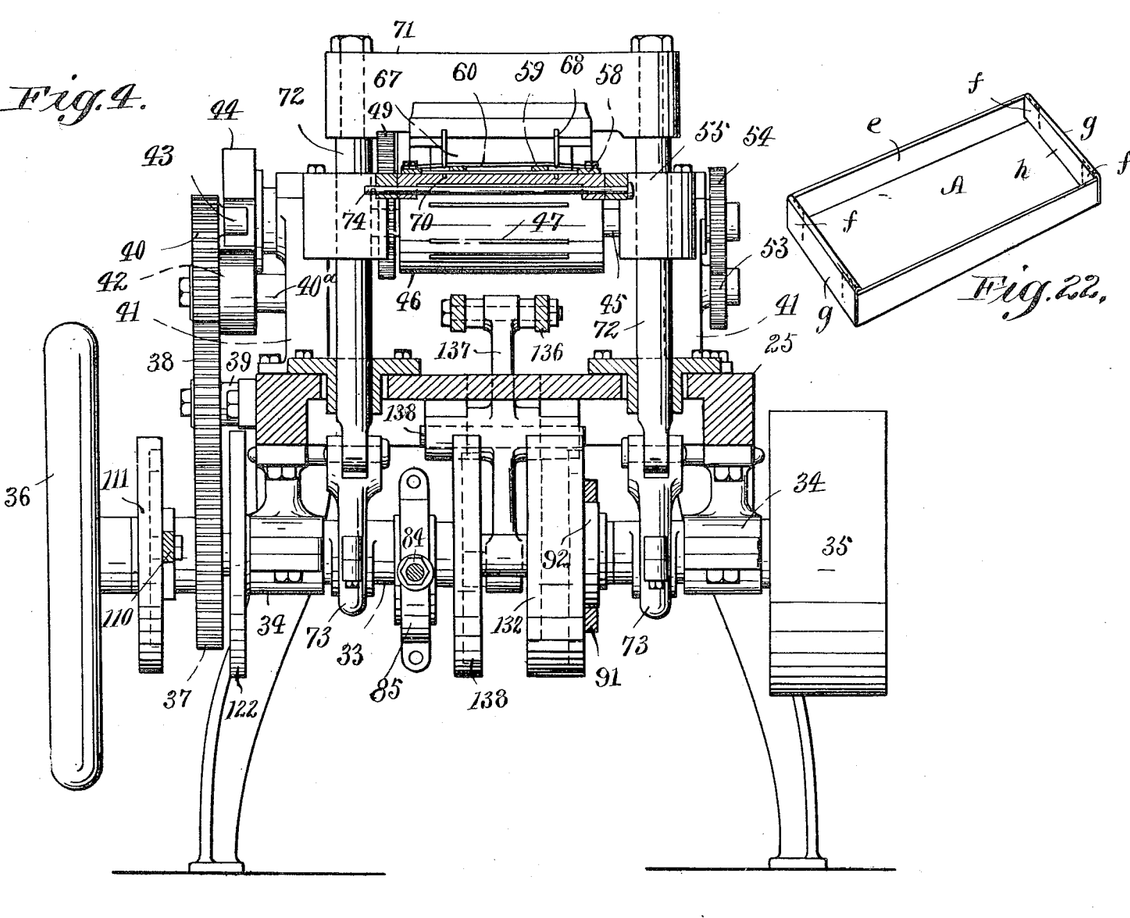

A driving shaft 33 is arranged crosswise of the machine and is journaled in suitable hangers 34 secured to the under side of the bed of the machine as shown in Fig. 4 and is designed to operate the several parts of the machine through suitable connections and sets of mechanisms, which will now be described in their respective orders. This shaft is provided upon one end with a pulley 35 through which a belt connection is made for driving the shaft and machine, and upon the opposite end of the shaft is mounted the usual fly wheel 36.

37 represents a gear mounted upon the driving shaft which meshes with and drives an idler gear 38 rotatably mounted upon a stud 39 secured to the side of the bed. This idler in turn meshes with and drives a third gear 40 mounted upon a stud 40ª secured to one of the side uprights 41 attached to the top of the bed of the machine. Secured to the near side of this gear 40 is a disk segment 42 which together with a pin 43 upon the said gear respectively engage the concave peripheral surfaces and the transverse groove surfaces of the cam 44, which connected parts constitute what is known as a Geneva stop movement, and is designed to transmit a successively rotary movement, to the feed rolls for successively moving the paper a predetermined distance with each operation of said stop movement, and which is obviously sufficient to form a blank for the box. The cam 44 of the said Geneva stop movement is mounted upon the lower roll shaft 45 which carries the lower feed and creasing roll 46 having the longitudinal creasing blades 47 set in its periphery. This feed roll and its shaft are connected to drive the upper feed roll 48 through a pair of gears 49 mounted upon the shafts of the respective rolls and whereby they are successively and simultaneously rotated in a forward direction to draw the strip of paper A, around the guide roll 31, and feed it forward to be creased, cut and folded. A series of longitudinal grooves 50 are formed in the upper feed roll 48 and are so spaced as to register and co-act with the blades 47 of the lower feed roll 46 as to transversely crease the strip of paper at proper intervals, during its movement through the rolls so as to form a preliminary crease a—a in the paper along the lines where it is to be later recreased and finally folded.

The shaft carrying the glue wheels 30 is connected by a train of gears 51, 52, 53, and 54 with roll shaft 45, and from this connection it will be noted, the glue wheels like the feed rolls are successively operated, that is, operated at such times as when the paper is being moved forward. It will be further noted that the peripheral surfaces of the wheels are cut away so that they come in contact with and glue the end portions of the edge of the paper only, thus placing the glue where required, to stick the ends of the paper in the final folding of the blank and forming of the box.

There are two uprights 41 bolted to the opposite side portions of the top of the bed of the machine and jointly serve to support a top plate 55, the feed rolls and other connected and operative parts as will be apparent from the several figures of the drawings. Suitable brackets 56 are secured to the end of the top plate 55 for carrying the guide roll 31 while the bearings 57 upon the top side of the plate serve for the upper feed roll 48 as is also clearly shown.

Figure 3:
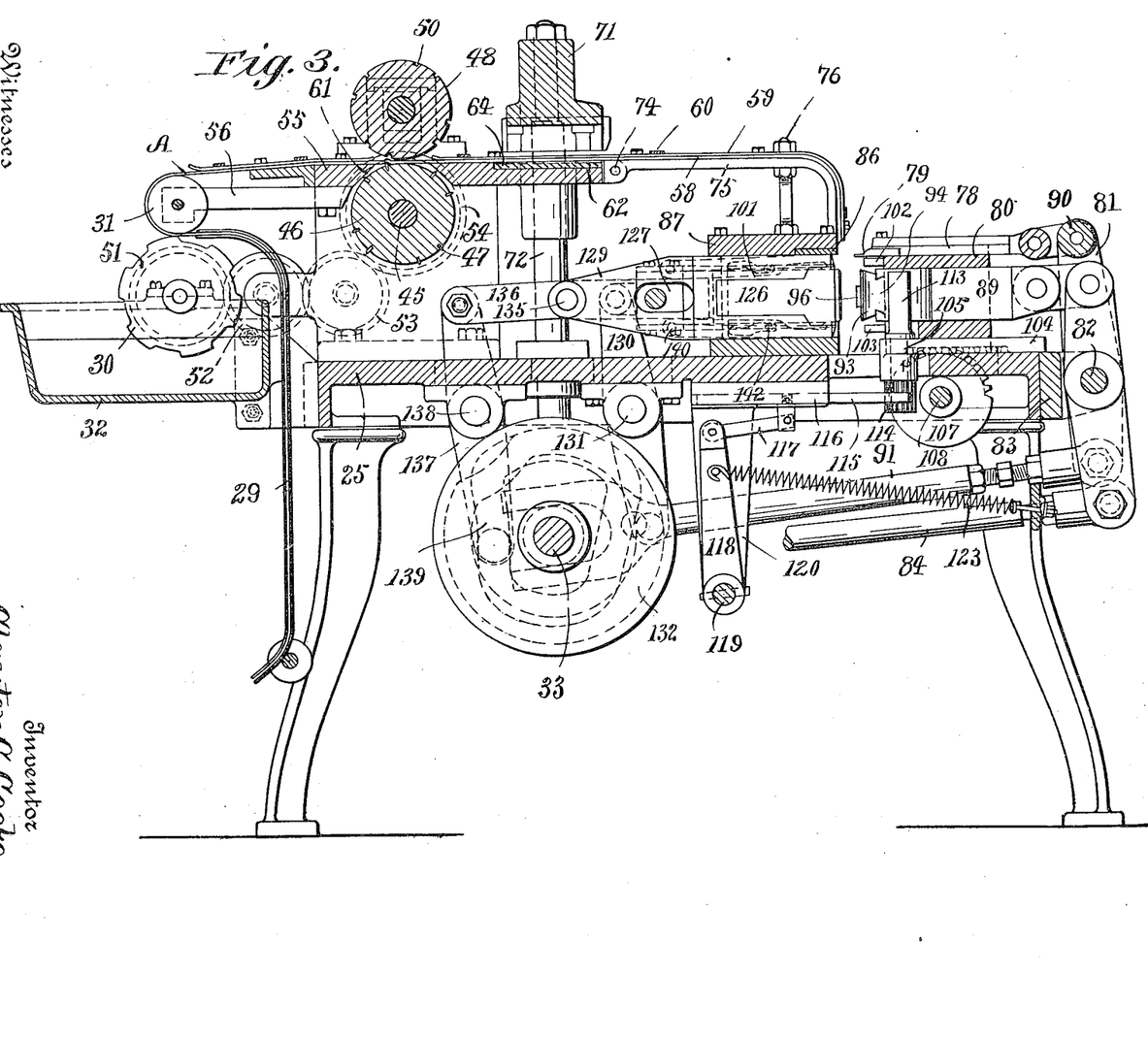
Fig. 3, is a longitudinal vertical section through the machine, taken on line 3—3 of Fig. 1, and which as will be noted is on the near side of the center.
Figure 5:
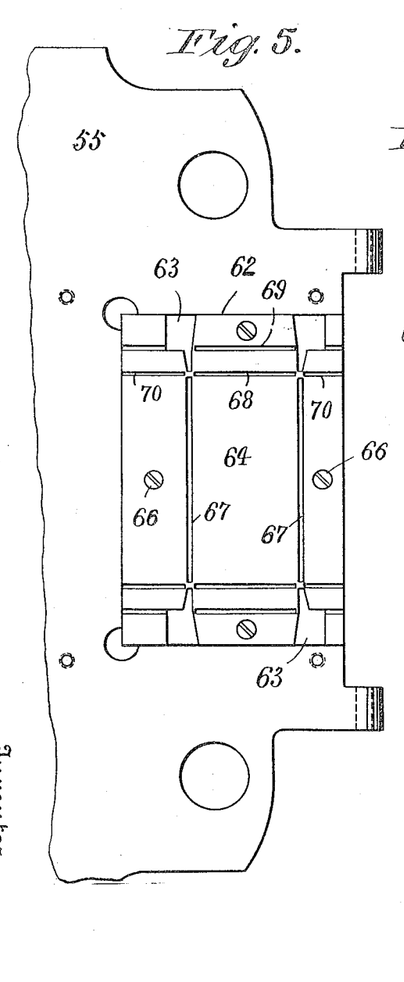
Fig. 5, is an enlarged detail plan view of the bed of the blank creasing, and box corner cutting mechanism.

The strip of paper A is guided through the machine by means of suitable longitudinal and cross guide strips 58, 59 and 60 respectively. I employ two guide strips 58 which are secured in part to the top plate 55 and thus form side guides against which the opposite side edges of the paper strip move, while the other two longitudinal strips 59 are arranged above the paper and are supported by the cross strips 60 that in turn are fastened to the said side guides 58. This construction forms an inclosure under which the paper strip may be freely moved though it is prevented from any sidewise or buckling movement, thus insuring its positive and successive movements with the movement of the feed rolls and likewise its proper positioning during the creasing, cutting and folding operations. The said top bed is provided with a transverse opening 61 (see Fig. 3) at a point where the rolls engage the paper to permit of the proper feeding and roll creasing operations, and is further provided upon its top side and in line with the movement of the paper, with a recess 62 and holes 63 to receive a die plate 64 and corner cutters 65, respectively, (see Figs. 3, 5, and 6). The die plate is secured in the recess by means of screws 66 and is provided in its top face with two cross grooves 67, side grooves 68, 69 and 70 for creasing the several corner edge portions of the box blank as will later be described. The edges of the holes 63 obviously operate in conjunction with the corner cutters 65 to sharply shear out the four notches $b$ in the strip of paper in the proper places to remove the surplus stock from the corners of the box blank to permit the ends to be properly folded together.

Figures 6, 7, 8, 9, 10:
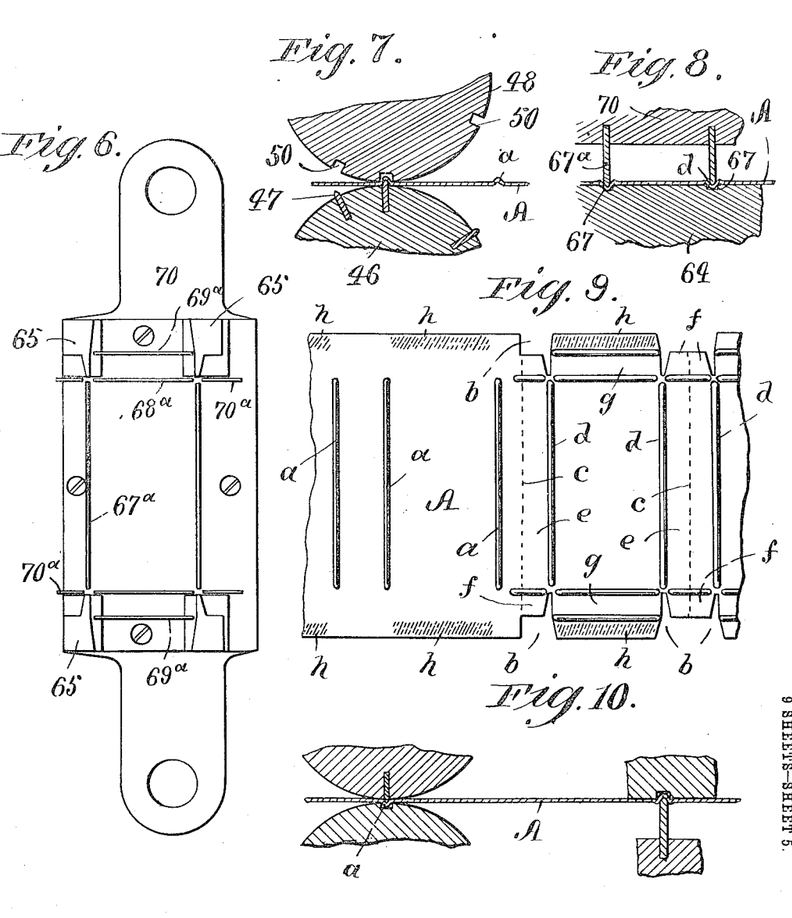
Fig. 6, is a detached plan view of the vertically operating gate that carries the creasing blades and corner cutters, and which operates in conjunction with the bed plate shown in Fig. 5.
Fig. 7, shows an enlarged vertical cross sectional view of the feed and creasing rolls, whereby the preliminary cross grooves are formed in the under side of the paper.
Fig. 8, shows a similar enlarged vertical cross sectional view of the bed and yoke with blades, in the act of re-creasing the paper along the same lines, but in an opposite direction from that produced by the rolls shown in Fig. 7.
Fig. 9, shows a plan view of a portion of the prepared paper strip with creases and corner cuts formed therein as produced by the mechanism just referred to and shown in detail in Figs. 5 to 8 inclusive.
Fig. 10, illustrates a modification, showing a reversed construction of rolls and creasers from that just described, and whereby the paper is first creased down instead of up as shown in Fig. 7, and next creased back or upward, instead of down as shown in Fig. 8.

71 represents a gate which is mounted upon a pair of vertically reciprocating rods 72 mounted in bearings of the before mentioned top plates 55 and the bed of the machine, respectively, and are connected to be reciprocated by a pair of eccentrics 73 mounted upon the driving shaft in a manner to impart a continuous reciprocatory movement to the gate which carries the before mentioned corner cutters 65 and creasing blades $67^a$, $68^a$ $69^a$ and $70^a$. The creasing blades $67^a$ are positioned to operate upon the paper strip in conjunction with the groove 67 and thus serve to crease the cross grooves $a$ in the paper to form the reverse creases $d$—$d$ as indicated in Figs. 8 and 9 thereby more completely breaking the paper to insure the side portions of the box to be finally disposed and to remain in, a right angle position, which would not be possible if the paper were creased in one direction only. The blades $68^a$, $69^a$ and $70^a$ operate upon the side portions of the paper strip in conjunction with the grooves 68, 69 and 70 to form longitudinal creases in the strip along the several lines of the folds of the end portions of the box as will again be referred to. In Fig. 9 I have shown a portion of the paper strip, one end of which has been operated upon by the feed rolls only, while the other end has in addition, been operated upon by the creasing blades and corner cutters to finally prepare the strip to be cut into blanks along the lines indicated by $c$, which cutting is done just prior to the forming of the box.

To the forward end of the top plate 55 is hinged (see Figs. 3 and 4) as by means of a pin 74, an extension 75 which together with the before mentioned guides 58, 59 and 60 attached thereto, serve to direct the prepared paper strip to the cutting and folding mechanisms. The forward end of this extension is supported upon posts 76 attached to a portion of the frame 88 of the machine, and connected to said extension by adjustable and removable nuts, whereby the said extension may be raised, lowered or removed should occasion require, as in the adjustment of the paper, or for the adjustment or repairing of the folding mechanism later to be described. The forward end of this extension and its guides are bent down so as to deflect the line of travel of the paper strip from a horizontal to a vertical position and in which position the blank is severed from the strip and folded between the head and formers of the folding mechanism later to be described.

Figure 11:
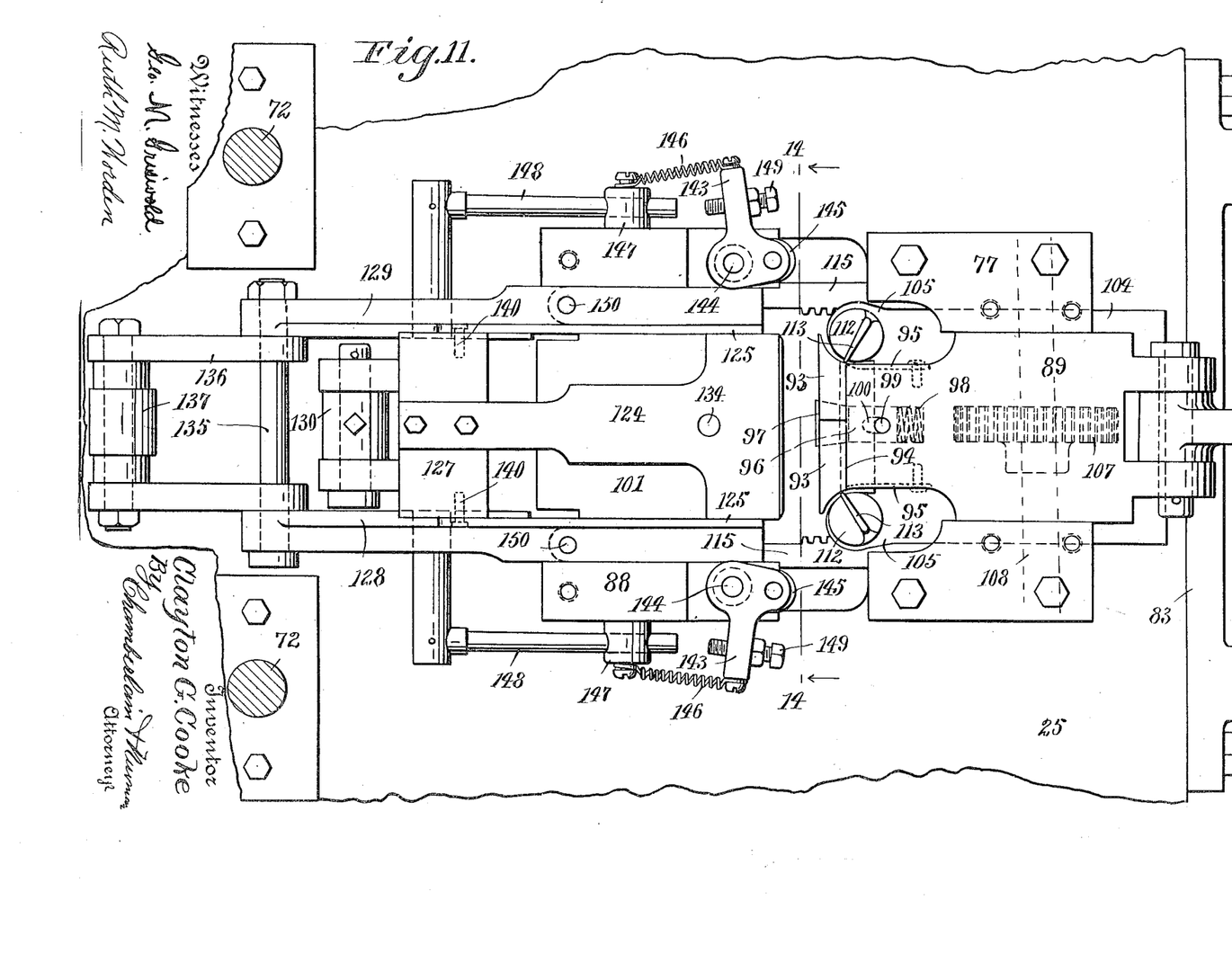
Fig. 11, shows an enlarged plan view, of the folding mechanism illustrated in the preceding Figs. 1, 2 and 3 but with paper guides and top plates of the two co-acting sets of folding devices removed.
Figures 12, 13:
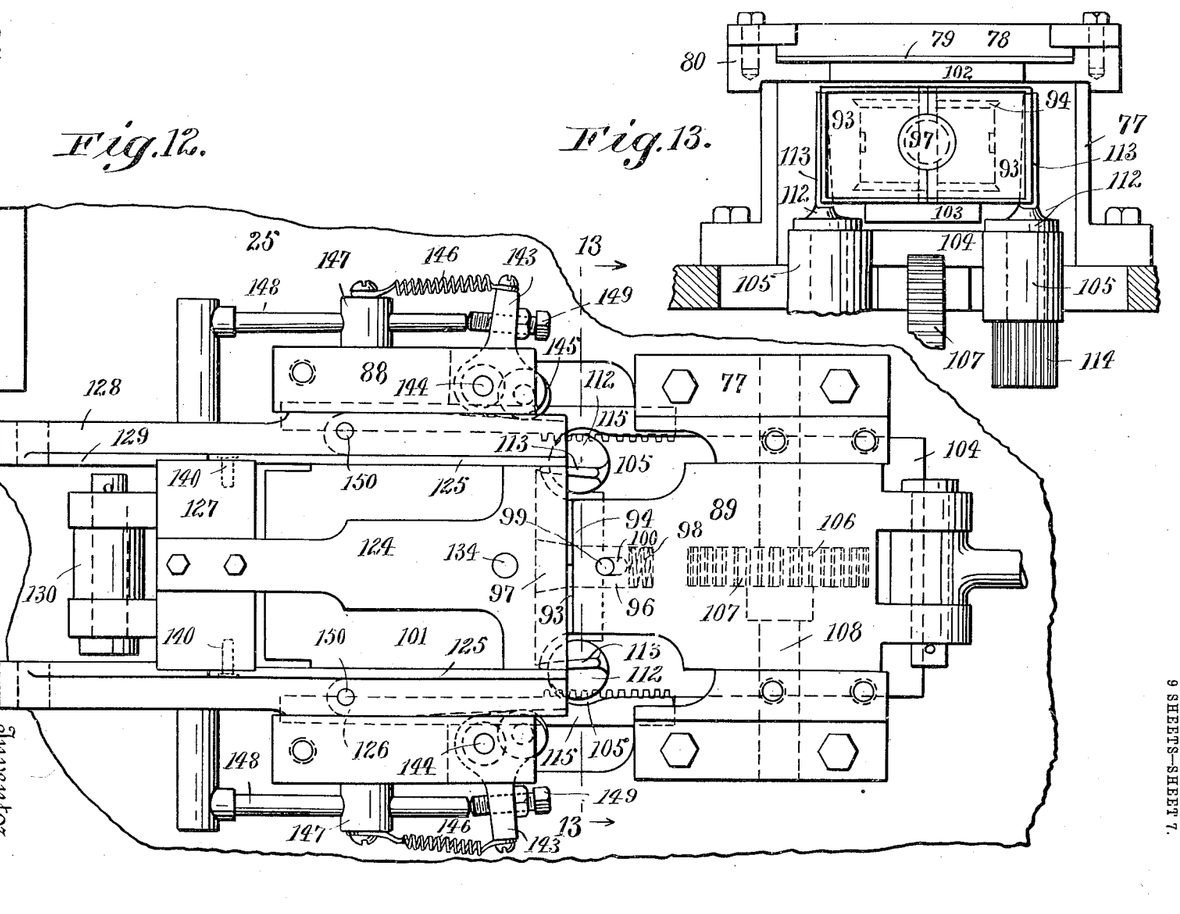
Fig. 12, is a similarly enlarged plan view, of the mechanism shown in Fig. 5, though in a closed position, as in the act of finally folding and finishing a box.
Fig. 13, is a correspondingly enlarged sectional end view, as seen from lines 13—13 of Figs. 2 and 12 and showing the cutter and end of former, over which the box is formed, and the two rotary folders for turning in the ends of the box blank.
Figure 14:
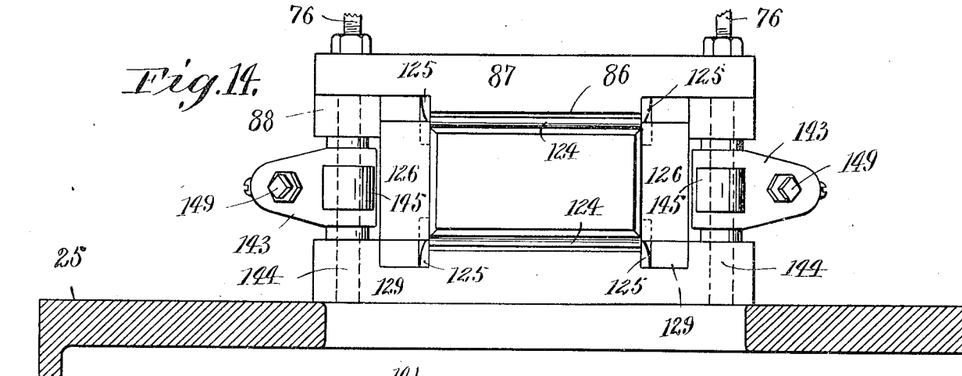
Fig. 14, shows a sectional elevation of the head, slides and folders, as seen from line 14—14 Fig. 11, looking in the direction of the arrow.
Figure 15:
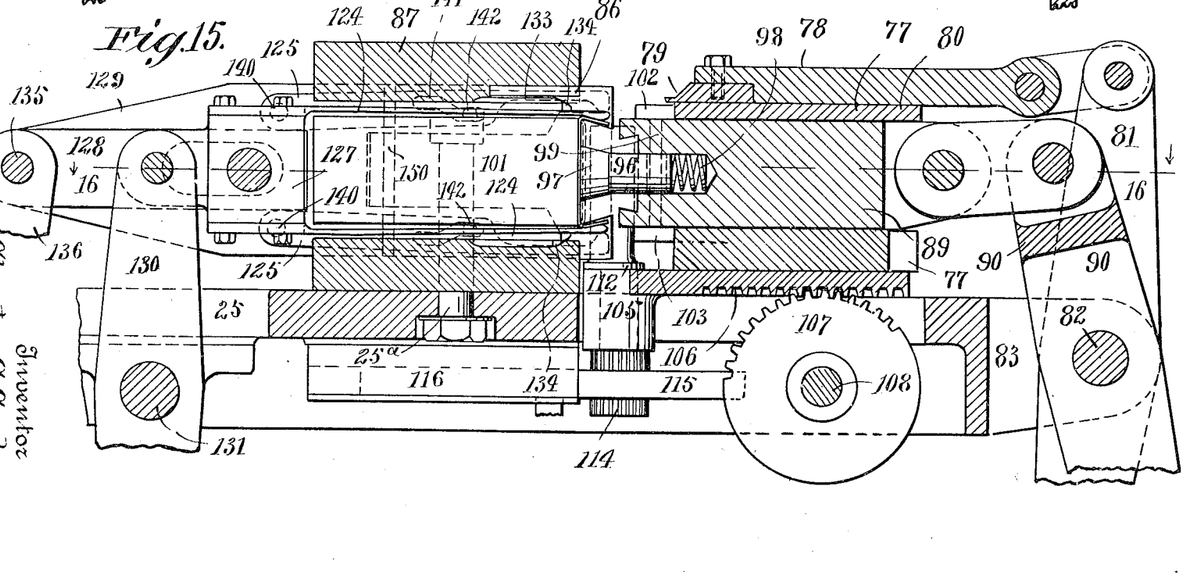
Fig. 15, is a central vertical longitudinal section through the folding and forming mechanisms shown in Figs. 5 to 8 inclusive, the position of the parts being in a slightly different position from that shown in either of said Figs. 5 to 8.

Upon the rear end of the machine (see Figs. 1, 2, 3 and 13) is bolted a housing 77 in which are mounted several slides including a cutter slide 78 carrying a blade 79 and designed to be reciprocated in ways formed in the top plate 80 of the housing 77. This cutter slide is linked to a rocker lever 81 mounted upon a pivot 82 secured to a bracket 83 attached to the end of the bed and to its lower end is connected a rod 84 the opposite end of which is connected with the cam or eccentric 85 mounted upon the driving shaft whereby the cutter is reciprocated backward and forward to shear off the blanks from the strip in conjunction with a plate 86 mounted in the top cross portion 87 of a second housing 88 secured to the intermediate forward portion of the bed of the machine, and in which a further series of slides and folders are operatively mounted. A former slide 89 mounted within the first mentioned housing 77, (see Figs. 11, 12, 13 and 15) is designed to be reciprocated, and like the cutter slide is connected by a link with a lever 90 mounted upon the same pivotal pin 82 and similarly connected by a rod 91 with a cam 92 mounted upon the main driving shaft and whereby a reciprocatory movement is imparted to the former slide. The former over which the box is folded is carried upon the forward end of this slide 89 and includes a pair of former plates 93 which are dovetailed to fit into transverse ways 94 in the forward end of the slide 89 so that the two said plates will be susceptible to sidewise movement, in addition to that imparted by the said slide, and by reason of the combined action of the two flat springs 95 secured to the opposite sides of the slide 89 and a spreader plug 96 mounted therebetween. The tendency of the said springs is to normally force the two former plates in against the tapered outer end portion 97 of the plug 96, seated within a bore of the slide and against a spring 98. A pin 99 is secured in the slide and freely passes through a slot 100 of the plug and serves to limit the outward movement of the same as indicated in Fig. 11, thus allowing the springs 95 to normally close the said plates together. These plates are again expanded when the slide 89 and plug 96 move forward to grasp the paper against the head block 101 arranged within the before mentioned housing 87 and secured to the bed of the machine by means of a bolt 25ᵃ. In this movement (see Figs. 11, 16 and 17) the plug obviously engages the paper and head block slightly in advance of the former plates, and is thus shoved in against the resistance of the spring 89 thereby forcing the two plates out in a proper position to have the box formed therearound. The purpose of this construction is to provide a former, of proper shape and size over which to form the box and from which the completed box can be freely stripped without disturbing the turned in end portions. After the box is formed and the slide starts to return, the plug remains in contact with the box and block for an instant, causing the former plates to first ride inward and down the incline 97 of the plug thereby freeing the ends of the box and leaving it in position to be stripped off by the upper and lower stripper plates 102 and 103 secured to the forward ends of the top plate 80 and the lower part of the housing 77, respectively.

Figure 1:
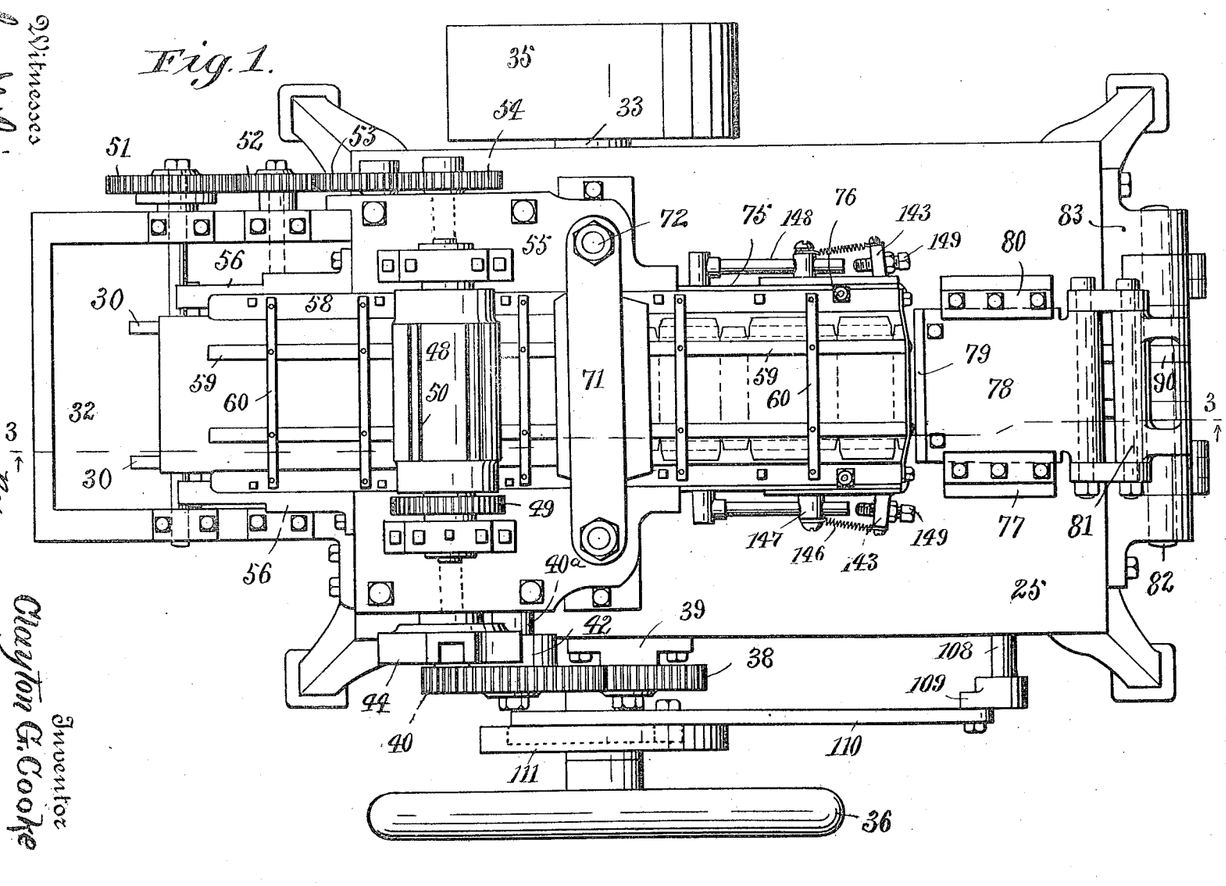
Figure 1, shows a plan view of my machine complete, with a strip of paper therein as in the act of being worked into boxes.
Figure 2:
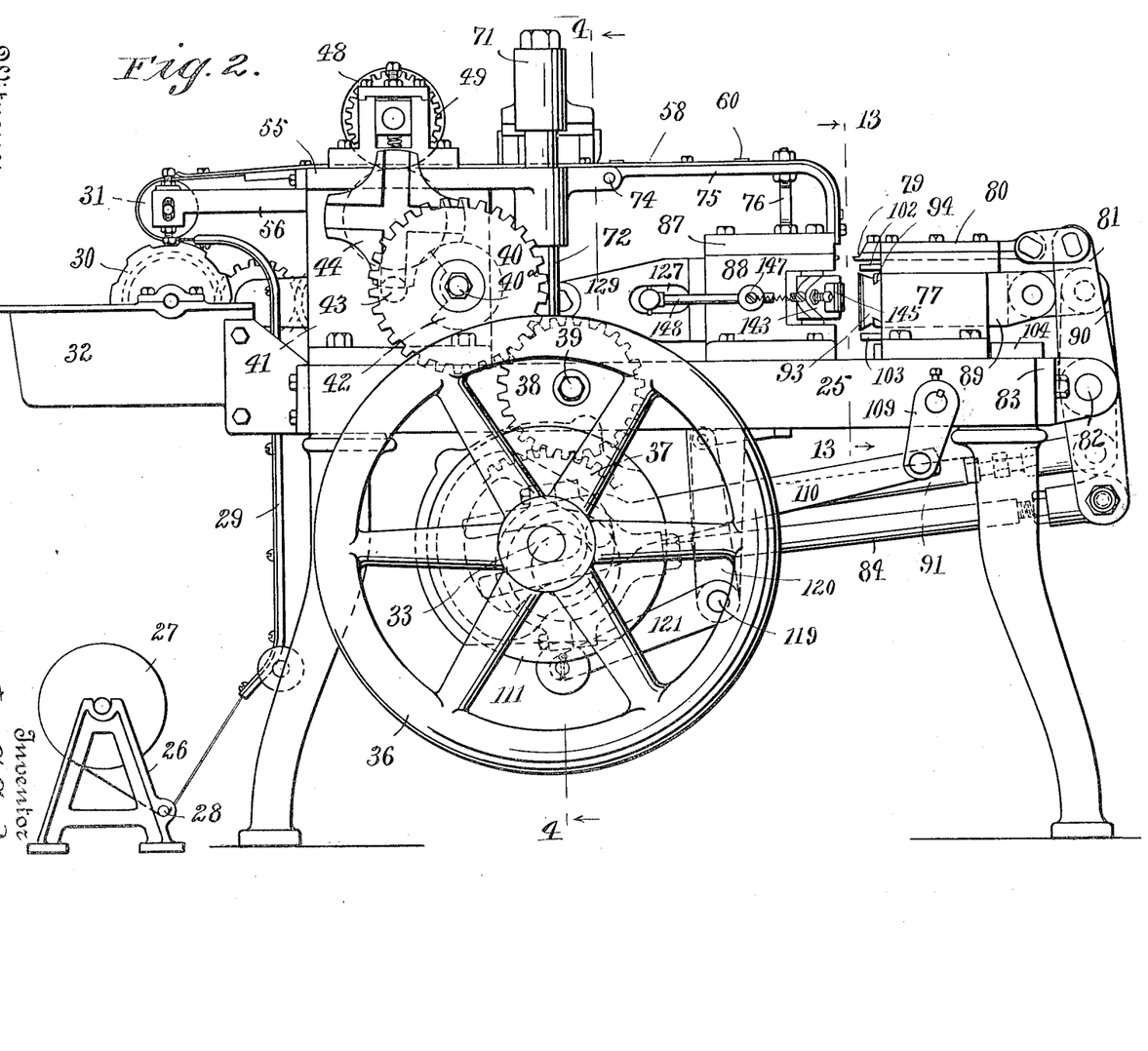
Fig. 2, is a side view of said machine as seen from the near or bottom side of Fig. 1.

A way is formed in the under side of the housing and beneath the stripper 103 to receive a bottom slide 104, the forward central portion of which is cut away to form opposite extended corner bearings 105 (see Figs. 12 and 13) which are also extended down through the bed of the machine. The slide 104 is reciprocated through the medium of an integral rack 106 cut in its under side and engaged by a segment of a gear 107 mounted upon a shaft 108 journaled in suitable bearings of the bed. To the outer end of this shaft (see Figs. 1 and 2), is secured an arm 109 which is connected by a link 110 with a cam 111 mounted upon the main driving shaft 33, and thus it will be understood that with each rotation of the driving shaft the said slide 104 is given a forward and return movement. Within the bearings 105 is mounted vertical spindles 112 carrying a special form of vertically extended blade 113 which constitutes a rotary folder for turning in and around and sticking the extreme end flaps h of the paper. These spindles and formers are operated through a pinion 114 secured to the lower ends thereof and connected by racks 115 slidably mounted in a bearing 116. Each of these slides are provided with a depending stud to which one end of a link 117 is attached the other end being similarly connected to arms 118 secured to a rocker shaft 119 journaled in hangers 120 attached to the under side of the machine. A third arm 121 is secured to the inner end of the machine, as seen in Fig. 2, and is provided with a roll to engage the peripheral surface of the cam 122 and whereby the said rocker shaft 108, the rack, slides, pinions and folders are operated in conjunction with the spring 123 secured intermediate of one of the arms 118 and the bed of the machine. These end folders 113 thus have both a forward and backward movement as imparted by the slide and in addition are given a rotary movement whereby they are rotated vertically when the slide is in its extreme forward position, so as to turn in and stick the end flap h of the paper, which is the final operation in the forming of the box and that just preceding the stripping of the box from the former plates. The head block 101 located within the second housing 88 serves as a fixed part against which the box blank is clamped by the former. The face of the head block as shown, is rectangular in shape and of a size corresponding to that of the length and breadth of the box. The several slidable formers and fingers for turning the respective edge portions of the box out at a right angle, as in the forming of a box, are slidably mounted within the housing 88 and intermediate of it and the said block, and are connected to operate in their respective orders to turn in the said edge portions to form the sides and ends as will next be described.

Figure 18:
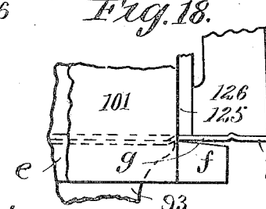
Figure 19:
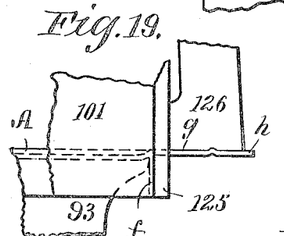

The top and bottom slides 124 are the first to operate upon the blank and serve to bend the sides of the paper blank formed along the double or recessed lines $d$—$d$ and deflect the side portions $e$—$e$ thereof to the opposite sides of the former plates 93, to form the sides of the box, and as is illustrated in Fig. 18. The next to operate are the four corner fingers 125 which move forward and serve to turn in the four corner flaps $f$ $f$ $f$ $f$ from the longitudinal position shown in Fig. 18 to a transverse position shown in Fig. 19, for the formation of a part of the end of the box. The third set of formers serve to operate upon the end portions $g$—$g$ of the box, and include the two side members 126 which after deflecting forward the said end portions of the box also serve in conjunction with the before mentioned rotary folders 113 which close over and stick the extreme end $h$ of the blank of the inside of the end portions $e$ $f$ and $g$ of the box and against the resistance of the said side members 126. These several fingers are connected to a pair of reciprocatory slides which in turn are connected to be operated from the main shaft 33 and will be described in detail in the respective orders of operation, as for instance the top and bottom former slides 124, (see Figs. 3, 11, 14 and 15), are secured to a block 127 the ends of which are grooved to engage ways 128 of a pair of side slides 129 and intermediate of which the said block is reciprocated in a manner to move the top and bottom folders forward and backward. This block 127 is provided with rearwardly disposed ears to which one end of a lever 130 is pivotally connected. The intermediate portion of this lever is mounted upon a pivotal pin 131 secured in bearings upon the under side of the bed. The lower end portion of this lever is provided with a roll to engage the groove 132 in the side of the before mentioned cam 92. In addition to the reciprocatory movements of these top and bottom folder slides, I also provide for a slight vertical movement whereby the sides of the box after being disposed forward to a right angle position, are slightly closed in along the sides of the former plates 93 to set the two sides of the box, and to insure the same being finally disposed at and remaining in a right angle position with relation to the bottom of the box. This mechanism includes the formation of a cam groove 133 in the under side of the top member 87 and in the top side of the bottom member of the housing 88. The forward end of these grooves are beveled out to be engaged by the beveled faced pins 134 and whereby when the said slides near the end of their forward movement they are sprung in and against the paper.

The two main side slides 129 are slidably mounted against the opposite sides of the head block 101 and intermediate thereof and the side portions of the housing 88. They are connected by means of a bolt 135 so as to be operated simultaneously from the main driving shaft, and in this respect the said bolt is connected by links 136 with a second bolt pivotally connected to the upper end of a rocker lever 137 mounted on a pivotal shaft 138 secured in a bearing attached to the under side of the bed. The opposite end of said lever is provided with a roll for the engagement of a groove in the side of a cam 139 mounted upon the main driving shaft 33 and whereby the said parts like the other mechanisms are given a complete forward and return movement with each rotation of the shaft.

Figure 16:
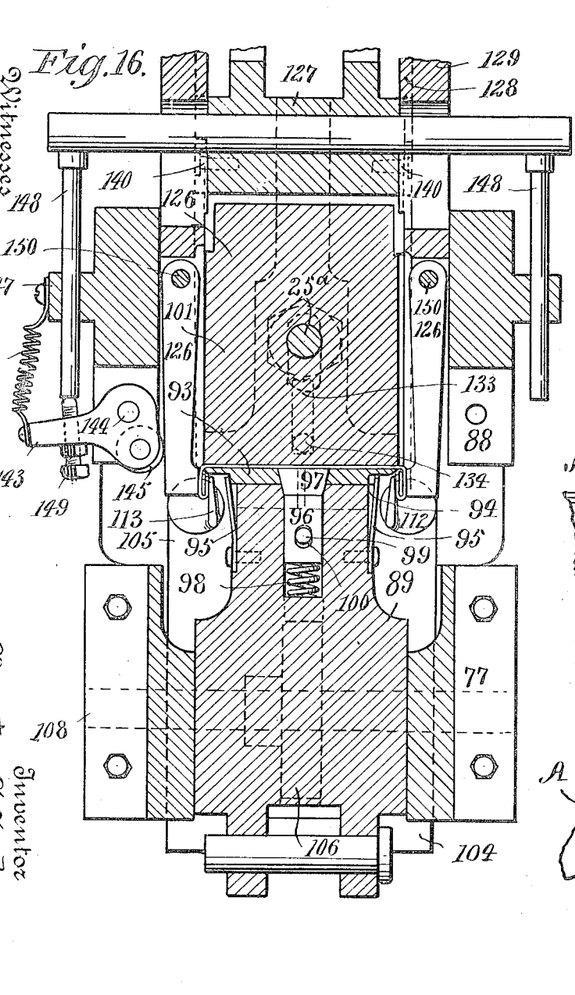
Fig. 16, is a horizontal longitudinal sectional plan view of the said forming and folding mechanisms just described, and taken on a central line indicated by 16 on Fig. 15.
Figure 17:
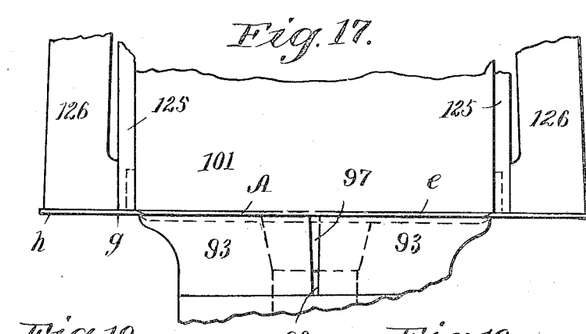
Figs. 17, to 21 inclusive, are diagrammatical views to illustrate the several operations of the folders in the folding of a box after the same has been creased and cut, and, Fig. 22, shows a perspective view of a tray or slide member of the box, such as my machine is designed to produce.
Figure 20:
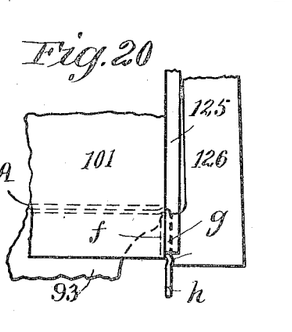
Figure 21:
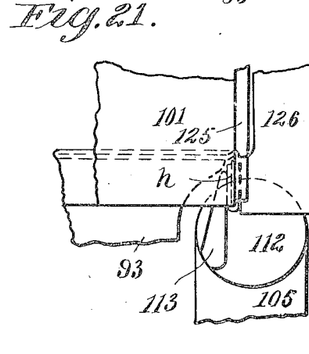

The four corner folder fingers 124, (see Figs. 14 and 15) are pivotally connected as at 140 to the ends of the slide 127 and are freely disposed longitudinally along the cutaway inner corner portion of the side slides, in a way to be moved forward and backward with the movement of the said slide block. The fingers are provided with an irregular shaped groove 141 that is engaged by a pin 142 seated in the sides of the side slides which by their forward movement impart an inner and outer vertical movement to the forward end of the said fingers 124, at the proper instant to turn down the corner flaps $f$ of the box from the position shown in Fig. 18 to that shown in Fig. 19, and then to be disposed up out of the way, to allow the side folders 126 to act. These fingers are obviously moved forward by the slide block 127, but are thus operated to form the corner flaps $f$ by the forward movement of the side slides 129 through the pin and groove connections just referred to. After the end flaps $g$ and $h$ have been turned forward by the side folders 126, as shown in Fig. 20, the rotary folders 113 are given substantially a half turn, which turns the blade half around from an outer to an inner position as shown in Figs. 16 and 21. This movement of the blades of the rotary folders carries the ends of the paper around, folding it over the edges of the corner flaps $f$ and sticking its glued faces $h$—$h$ thereagainst and to the portions of the end of box, and against the then fixed position of the side folders 126. Immediately following the extreme forward movement of the rotary folders, the side folders 126 are given an inward movement which act against the sides of the blades of the rotary formers, to closely pinch the several thicknesses of paper together and insure their sticking. This closing movement of the side folders 126 is obtained through the duplicate mechanisms shown in Figs. 1, 2, 11, 12 and 16, and in part is mounted in the forward ends of the side portions of the housing 88 which are cut away to receive a bell crank lever 143 that is pivoted to the said sides through the medium of a vertically disposed pin 144. The forwardly disposed arm of this lever carries the roll 145 that engages the outer sides of the said side folders 126, while the outwardly disposed arms of the said bell crank levers are connected as by means of a spring 146 with a stud 147 attached to the side portions of the housing. The tendency therefore of the springs is to hold the rolls of the lever out free from the sides of the folders 126 and until such time as when the slide rods 148 carried by the slide 127 comes forward sufficient to engage the adjustable screws 149 of the levers which engagement causes the levers to be rocked upon their pins and their rolls forced in against the sides of the folders 126 in a manner to crowd the forward ends *g* and *h* thereof in, and deflect the end portions of the blank from a longitudinal to a right angle position. These side folders are pivoted to the side slides 129 by vertically disposed pins 150 and whereby they are positively carried back and forth with the said slides, but permitted to swing in and out as a result of the engagement and release of the said levers.

The several operations of the machine for creasing, blanking and cutting of the box blank and the folding of the box have been hereinbefore described in detail with the description of the construction of the respective mechanisms and it is therefore thought that a further general description of the machine will not be necessary and is consequently omitted.

Having thus described my invention what I claim and desire to secure by Letters Patent is—

1. In a paper box machine of the class described, the combination with box blank preparing mechanism, of means for turning out the side and end portions of the blank at substantially a right angle, rotary folders for folding over and in the extended end portions of the box blank and for compressing and sticking the said folded over end portions of the blank against the blades of the rotary folders to the inside of the box to retain the parts in position.

2. In a paper box machine of the class described, the combination with cutting and creasing mechanism, of means for folding out the several side portions of the box blank at substantially a right angle, a pair of vertically arranged folders for folding over and in the end portions of the box blank in a way to secure it to the inside of the end portions of the box and a slide upon which the rotary folders are mounted to move the same to and from the box blank.

3. In a paper box machine of the class described, the combination with box blank preparing mechanism, of means for turning out the side and end portions of the box blank at substantially a right angle, rotary folders for turning over and in the extended end portions of the box blank and for further compressing and sticking the said folded over end portions of the blank against the inside of the box.

4. In a paper box machine of the class described, the combination with mechanism for creasing and feeding a continuous strip of paper, means for further creasing, cutting and preparing a box blank, folders for respectively turning up the side corners and end portions of the box blank at a right angle, and rotary folders having eccentrically arranged blades for further folding over and in the extended end portions of the box and sticking the same to the inner side of the box.

5. In a paper box machine of the class described, the combination with mechanism for gluing, feeding, creasing and blanking a continuous strip of paper, of mechanisms for respectively turning out the sides, corners and end portions of the prepared box blank and disposing the same at a right angle to the body, and rotary folders for folding over and in such right angled disposed end portions of the box in a way to cover the edges of the corner portions of the box and to press the previously glued end portions against itself and that of the sides of the corner portions in a way to form a box with reinforcing side or end portions.

6. In a box forming machine, the combination with blank feeding creasing and forming devices, of a former against which the box blank is held, slides for disposing the edges of the blank against the sides of the former, fingers for turning in the free corner ends of said side portions, end formers for disposing the ends of the paper blank against the said previously disposed corner portions, and rotary folders having eccentrically arranged blades for further folding over and in the extended end portions of the ends of the box blank to unite and reinforce the end portions of the box.

7. In a paper box machine of the class described, the combination with feeding, gluing, creasing, blanking and cutting devices, of means for disposing the several side and end portions of the box blank out at a right angle and against each other, a pair of rotary folders designed to engage the extended end portions of the box and fold them over and in, to reinforce and strengthen said end portions of the box, and a reciprocating slide in which the rotary folders are mounted and adapted to move the same to and from the box blank as occasion requires.

8. In a paper box machine of the class described, the combination with suitable clamping devices, of a series of folders for engaging and disposing the several edge portions of a box blank out substantially at a right angle, of rotatable folders for folding over and in the extended end portions of said sides to reinforce and strengthen the same, means for moving the rotatable folders to and from the box blank, and means for imparting a rocker movement to the said folders.

9. In a paper box machine of the class described, the combination with suitable box blank preparing devices, of an expansible and collapsible former over which the box is formed, and means for folding over the several side portions of the box blank against the former to form a box and rotary folders to turn in the extended end portions of the blank against the inside of the box.

10. In a paper box machine of the class described, the combination with suitable box blank preparing devices of a former upon which to form a box and including a pair of expansible slides, a yieldable tapered plug to automatically operate the said slides lengthwise of the box, and means for turning over the side portions of the box blank against the slides of the former.

11. In a paper box machine of the class described, the combination with suitable box blank forming devices, of folders for turning up the several side portions of the box, end folders for turning over and in the end portions of a box, a collapsible former including a pair of expandible plates against which the said box is formed, means to normally hold said plates closed together, and a tapered plug arranged between the plates to spread the same.

12. In a paper box machine of the class described, the combination with a fixed head block, of a slide reciprocatingly mounted with respect to said block, former plates slidably mounted in the face of the slide to engage the blank, means arranged between the plates to engage the head block to operate and extend the plate, and means for folding a box blank over the said former plates while in their extended positions.

Signed at New Haven in the county of New Haven and State of Connecticut this 18th day of January A. D., 1911.

CLAYTON GUY COOKE.

Witnesses:
E. M. HASTINGS,
J. D. TERRILL.